US012044133B2

(12) United States Patent
Wang et al.

(10) Patent No.: US 12,044,133 B2
(45) Date of Patent: Jul. 23, 2024

(54) AEROENGINE COMPRESSOR AND POSITION HOLDING STRUCTURE OF ADJUSTABLE STATOR VANE

(71) Applicants: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

(72) Inventors: Jiaguang Wang, Shanghai (CN); Bin Zhu, Shanghai (CN); Miaomiao Zhang, Shanghai (CN); Haomai Gao, Shanghai (CN); Chuanjun Cao, Shanghai (CN)

(73) Assignees: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

( * ) Notice: Subject to any disclaimer, the term of this patent is extended or adjusted under 35 U.S.C. 154(b) by 0 days.

(21) Appl. No.: 18/251,755

(22) PCT Filed: Oct. 22, 2021

(86) PCT No.: PCT/CN2021/125464

§ 371 (c)(1),
(2) Date: May 4, 2023

(87) PCT Pub. No.: WO2022/095719

PCT Pub. Date: May 12, 2022

(65) Prior Publication Data

US 2023/0407760 A1 Dec. 21, 2023

(30) Foreign Application Priority Data

Nov. 6, 2020 (CN) ........................ 202011226873.6

(51) Int. Cl.
*F01D 17/16* (2006.01)
*F04D 29/56* (2006.01)

(52) U.S. Cl.
CPC ........... *F01D 17/16* (2013.01); *F01D 17/162* (2013.01); *F04D 29/563* (2013.01);
(Continued)

(58) Field of Classification Search
CPC .... F04D 29/563; F04D 29/462; F01D 17/162; F05D 2260/79; F05D 2260/36
(Continued)

(56) References Cited

U.S. PATENT DOCUMENTS 1,594,054 A * 7/1926 Fiego ...................... F16C 17/08 384/246
2,950,084 A * 8/1960 Perry .................... F01D 17/162 415/180

(Continued)

FOREIGN PATENT DOCUMENTS

CN 1995763 A 7/2007
CN 202690536 U 1/2013

(Continued)

OTHER PUBLICATIONS

International Search Report issued on Jan. 14, 2022, in corresponding International Patent Application No. PCT/CN2021/125464, 8 pages.
Office Action issued on Dec. 24, 2020, in corresponding Chinese Application No. 202011226873.6, 9 pages.

*Primary Examiner* — Christopher Verdier
*Assistant Examiner* — Michael K. Reitz
(74) *Attorney, Agent, or Firm* — Maier & Maier, PLLC

(57) ABSTRACT

An adjustable stator blade position maintaining structure for an aero-engine compressor, which keeps an adjustable stator blade at a preset position when a compressor works. The
(Continued)

adjustable stator blade position maintaining structure includes a positioning section, a limiting section and a force transmission section The positioning section is mounted in a mounting hole in a casing; the limiting section is cone-shaped and thus fits into a conical hole in the top of a journal of the adjustable stator blade; and the force transmission section is connected between the positioning section and the limiting section so as to transmit a load from the limiting section to the positioning section.

13 Claims, 2 Drawing Sheets

(52) U.S. Cl.
CPC .................. *F05D 2220/323* (2013.01); *F05D 2240/128* (2013.01); *F05D 2260/60* (2013.01)

(58) Field of Classification Search
USPC .................................................. 415/160, 162
See application file for complete search history.

(56) References Cited

U.S. PATENT DOCUMENTS

| | | | | | |
|---|---|---|---|---|---|
| 3,999,883 | A * | 12/1976 | Nordenson | F01D 17/162 | 415/113 |
| 4,834,613 | A * | 5/1989 | Hansen | F01D 17/162 | 415/189 |
| 4,867,635 | A | 9/1989 | Tubbs | | |
| 6,824,355 | B2 * | 11/2004 | Behrendt | F01D 17/162 | 415/160 |
| 2019/0048738 | A1 | 2/2019 | Perez | | |

FOREIGN PATENT DOCUMENTS

| | | | |
|---|---|---|---|
| CN | 202811550 | U | 3/2013 |
| CN | 203717458 | U | 7/2014 |
| CN | 106089810 | A | 11/2016 |
| CN | 106194843 | A | 12/2016 |
| CN | 106545524 | A | 3/2017 |
| CN | 206503781 | U | 9/2017 |
| CN | 112096658 | A | 12/2020 |
| JP | 57-168097 | A | 10/1982 |
| JP | 58-206810 | A | 12/1983 |

* cited by examiner

AEROENGINE COMPRESSOR AND POSITION HOLDING STRUCTURE OF ADJUSTABLE STATOR VANE

TECHNICAL FIELD

The invention relates to the technical field of aerospace, in particular to an aeroengine compressor and a position holding structure of an adjustable stator vane.

BACKGROUND

At present, in aero-engine compressors at home and abroad, the first few stages of stator vanes are usually designed to be adjustable stator vanes to improve the margin of the high-pressure compressor in all working conditions, the blade installation angle needs to be adjusted based on the working conditions during the working process of the adjustable stator vanes to ensure that the high-pressure compressor has sufficient margin, thereby ensuring the safe operation of the whole machine. The outer neck journal of the adjustable stator vane is mounted on the stator vane neck journal mounting hole of the stator casing, a non-metallic easy-to-wear bushing is generally provided between the blade and the blade mounting hole of the casing to prevent the wear between the metal blade and the metal casing, the blade neck journal and the bushing and the busing and the blade mounting hole of the stator casing are usually engaged by small clearance fit. However, the prior art has the following problems:

1) The adjustable stator vane will be tilted due to the airflow during the working process, and the axis of the blade neck journal will be shifted from the design expectation, so the position of the blade will be shifted from the design expectation, reducing the effect of rectifying the airflow;
2) The actual fitting clearance between each blade and the bushing, the bushing and the blade mounting holes on the casing in the circumferential direction of the same stage will be different inevitably due to the distribution of tolerances. This difference, on one hand, leads to the difference in the inclination degrees of the adjustable stator vanes at the same stage due to the airflow, resulting in different rectification effect of each blade in the circumferential direction of the same stage, and on the other hand, leads to difference in the drag forces generated when rotating the blades at each stage, resulting in different installation angles of each blade at the same stage during the working process, affecting the aerodynamic performance;
3) As the process time of the engine increases, the wear between the blade and the bushing, the bushing and the casing leads to further increase in the gap between themselves, and the problem 1) and 2) mentioned above will become even worse inevitably.

SUMMARY

A purpose of the invention is to provide a position holding structure of an adjustable stator vane for an aeroengine compressor, which can solve the technical problem in the prior art, the adjustable stator vane can be held at a predetermined position when the aero-engine compressor is at a working state, thereby improving the aerodynamic performance of the high-pressure compressor to a certain extent.

The above purpose of the invention can be achieved by the position holding structure of the adjustable stator vane for the aeroengine compressor, the position holding structure of the adjustable stator vane comprises a positioning section, a limiting section and a force transmission section, wherein the positioning section is mounted on a mounting hole on a casing, the limiting section is in the shape of a cone for fitting a taper hole on the top of a neck journal of the adjustable stator vane, and the force transmission section is connected between the positioning section and the limiting section for transmitting load from the limiting section to the positioning section.

According to the above technical solution, the position holding structure of the adjustable stator vane for the aero-engine compressor of the invention has the following beneficial technical effects: the adjustable stator vane can be held at a predetermined position when the aero-engine compressor is at a working state, thereby improving the aerodynamic performance of the high-pressure compressor to a certain extent.

Specifically, the invention provides the position holding structure of the adjustable stator vane for the aero-engine compressor, the position holding structure of the adjustable stator vane is fixed on the casing and limited by the feature similar to a top hole (taper hole) on the outer neck journal of the adjustable stator vane, where the cone on the limiting section fits the taper hole on the top of the neck journal of the adjustable stator vane, providing a reaction force when the adjustable stator vane tends to tilt for limiting the adjustable stator vane, which can prevent the adjustable stator vane from being deflected and shifted from the design position due to the airflow during operation, and improve the implementation of the installation angle of blades at the same stage, thereby improving the aerodynamic performance of the high-pressure compressor to a certain extent.

Preferably, the positioning section is in the shape of a bushing and is in an interference fit with the mounting hole.

According to the above technical solution, the position holding structure of the adjustable stator vane for the aero-engine compressor of the invention has the following beneficial technical effects: the positioning section and the position holding structure of the adjustable stator vane can be positioned precisely onto the mounting hole on the casing.

Preferably, a taper angle of the limiting section ranges from 45 degrees to 135 degrees.

According to the above technical solution, the position holding structure of the adjustable stator vane for the aero-engine compressor of the invention has the following beneficial technical effects: the ability of holding the position of the adjustable stator vane can be further enhanced by setting an appropriate taper angle of the limiting section.

Preferably, the linear expansion coefficient of the material of the position holding structure of the adjustable stator vane is greater than or equal to the linear expansion coefficient of the material of the casing or the adjustable stator vane.

According to the above technical solution, the position holding structure of the adjustable stator vane for the aero-engine compressor of the invention has the following beneficial technical effects: ensuring that a positioning surface would not disengage when the aero-engine compressor is at the actual working state.

Preferably, the force transmission section is of open type.

According to the above technical solution, the position holding structure of the adjustable stator vane for the aero-engine compressor of the invention has the following beneficial technical effects: not hindering the movement of the rocker arm Preferably, an opening angle of the force transmission section is a maximum movement angle of a rocker arm for adjusting an installation angle of the adjustable stator vane plus a predetermined allowance.

According to the above technical solution, the position holding structure of the adjustable stator vane for the aero-engine compressor of the invention has the following beneficial technical effects: not hindering the movement of the rocker arm more effectively.

Preferably, the ratio of the height of the force transmission section to the height of the limiting section ranges from 3 to 8.

According to the above technical solution, the position holding structure of the adjustable stator vane for the aero-engine compressor of the invention has the following beneficial technical effects: the limit effect of the limiting section can be improved, and the adjustable stator vane can be held at the predetermined position more effectively when the aero-engine compressor is at the working state, thereby improving the aerodynamic performance of the high-pressure compressor to a certain extent.

Preferably, the position holding structure of the adjustable stator vane works when the aero-engine compressor is at the working state, holding the adjustable stator vane at the predetermined position.

According to the above technical solution, the position holding structure of the adjustable stator vane for the aero-engine compressor of the invention has the following beneficial technical effects: preventing the adjustable stator vane from being deflected and shifted from the design position due to the airflow during the operation of the aero-engine compressor, thereby improving the aerodynamic performance of the high-pressure compressor to a certain extent.

The above purpose of the invention can also be achieved by an aeroengine compressor, wherein the aeroengine compressor comprises the position holding structure of the adjustable stator vane for the aero-engine compressor according to any one of the preceding aspects.

According to the above technical solution, the aeroengine compressor has the following beneficial technical effects: the adjustable stator vane can be held at the predetermined position when the aero-engine compressor is at the working state, thereby improving the aerodynamic performance of the high-pressure compressor to a certain extent.

Preferably, a bushing provided between a neck journal and the positioning section of the adjustable stator vane.

According to the above technical solution, the aeroengine compressor has the following beneficial technical effects: the wear between the adjustable stator vane and the position holding structure of the adjustable stator vane can be avoided effectively.

LIST OF REFERENCE SIGNS

Figure 1:
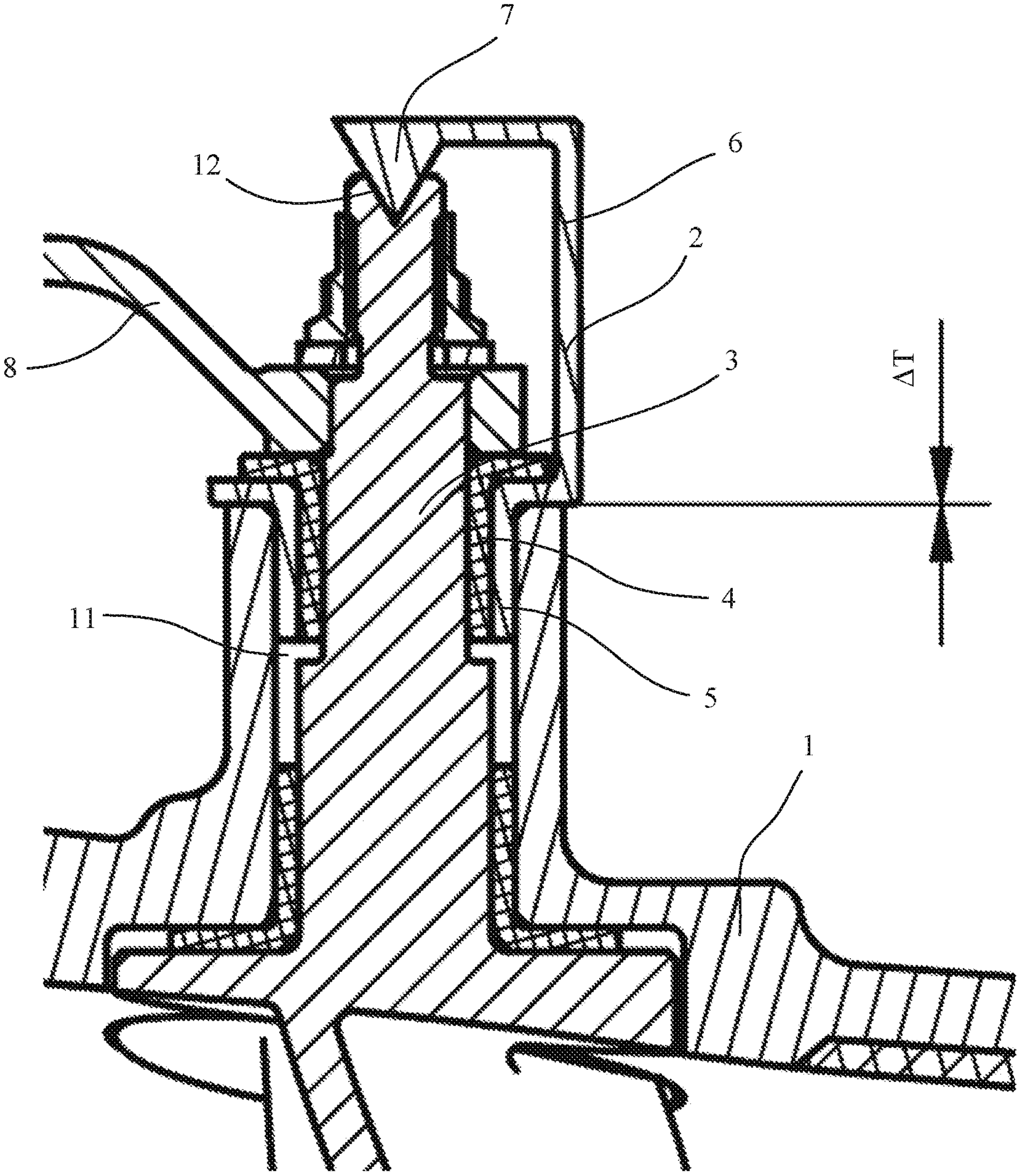
FIG. 1 is a partial schematic section view of an aero-engine compressor according to an embodiment of the invention.

1. casing
2. position holding structure of the adjustable stator vane
3. adjustable stator vane
4. bushing positioning section

6. force transmission section
7. limiting section
8. rocker arm
11. mounting hole
12. taper hole
M. height of the force transmission section
N. height of the limiting section
ΔT. gap

DETAILED DESCRIPTION

The specific embodiments of the present invention will be described below. It should be noted that, in the specific description of these embodiments, for the brevity and conciseness of description, this specification may not describe all the features of the actual embodiments in detail. It should be understood that in the actual implementation process of any embodiment, as in the process of any engineering project or design project, in order to achieve the specific goals of the developer and to meet the system-related or business-related constraints, a variety of specific decisions are often made, and this can vary from one implementation to another. In addition, it will also be understood that although such efforts made during the development process may be complex and tedious, for those of ordinary skill in the art who are related to the disclosure of the present invention, the changes in design, manufacture or production made based on the technical contents disclosed in the present disclosure are only conventional technical means, which should not be considered as insufficient disclosure of the present invention.

Unless otherwise defined, the technical or scientific terms used in the claims and the specification should be considered as the ordinary meaning understood by those of ordinary skill in the art to which this invention belongs. The terms such as 'First', 'second', etc. used in the description and the claims of the patent application of the present invention do not denote any order, quantity or importance, but are only used to identify different components. The terms such as 'A', 'an', etc. do not denote a quantitative limitation, but rather denote the presence of at least one. The terms such as 'include', 'comprise', etc. mean that the element or object appearing before the term 'include' or 'comprise' covers the element or object listed after the term 'include' or 'comprise' and their equivalents, and do not exclude other components or objects. The terms such as 'connect', 'contact', etc. are not limited to physical or mechanical connections, nor limited to direct or indirect connections.

It should be understood that the term 'a position holding structure of an adjustable stator vane' refers to a structure that can be used to hold the position of the adjustable stator vane.

Figure 2:
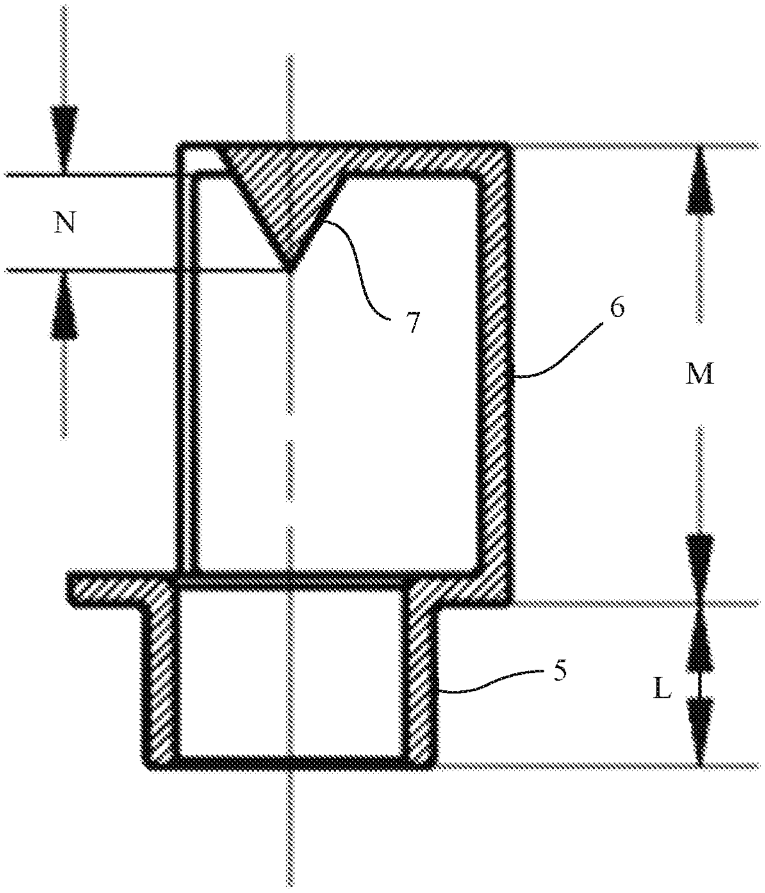
FIG. 2 is a schematic section view of a position holding structure of an adjustable stator vane for the aero-engine compressor according to an embodiment of the invention.

FIG. 1 is a partial schematic section view of an aero-engine compressor according to an embodiment of the invention. FIG. 2 is a schematic section view of a position holding structure of an adjustable stator vane for the aero-engine compressor according to an embodiment of the invention. It should be noted that, in order to show the positional relationship between the position holding structure of the adjustable stator vane 2, the adjustable stator vane 3 and a casing 1 better, FIG. 1 only shows a part of the adjustable stator vane 3 rather than a whole, i.e. shows an entire neck journal of the adjustable stator vane 3 and a small part of a blade body portion.

As shown in FIG. 1 and FIG. 2, in one embodiment of the invention, the position holding structure of the adjustable stator vane 2 for the aero-engine compressor comprises a positioning section 5, a limiting section 7 and a force transmission section 6, wherein the positioning section 5 is mounted on a mounting hole 11 (i.e. a hole for mounting the neck journal of the adjustable stator vane) on the casing 1 (i.e. the casing of aero-engine compressor), the limiting section 7 is in the shape of a cone for fitting a taper hole 12 on the top of the neck journal of the adjustable stator vane 3, and the force transmission section 6 is connected between the positioning section 5 and the limiting section 7 for transmitting the load from the limiting section 7 to the positioning section 5.

According to the above technical solution, the position holding structure of the adjustable stator vane for the aero-engine compressor of the invention has the following beneficial technical effects: the adjustable stator vane can be held at a predetermined position when the aero-engine compressor is at a working state, thereby improving the aerodynamic performance of the high-pressure compressor to a certain extent.

Specifically, the present invention provides the position holding structure of the adjustable stator vane for the aero-engine compressor. The position holding structure of the adjustable stator vane is fixed on the casing and limited by the feature similar to a top hole (taper hole) on the outer neck journal of the adjustable stator vane, where the cone on the limiting section fits the taper hole on the top of the neck journal of the adjustable stator vane, providing a reaction force when the adjustable stator vane tends to tilt for limiting the adjustable stator vane, which can prevent the adjustable stator vane from being deflected and shifted from the design position due to the airflow during operation, and improve the implementation of the installation angle of blades at the same stage, thereby improving the aerodynamic performance of the high-pressure compressor to a certain extent.

In some embodiments, as shown in FIG. 1 and FIG. 2, the positioning section 5 is in the shape of a bushing and is in an interference fit with the mounting hole 11, so the positioning section and the position holding structure of the adjustable stator vane can be positioned precisely onto the mounting hole on the casing.

In some embodiments, as shown in FIG. 1 and FIG. 2, a taper angle of the limiting section 7 ranges from 45 degrees to 135 degrees. The ability of holding the position of the adjustable stator vane can be further enhanced by setting an appropriate taper angle of the limiting section.

In some embodiments, as shown in FIG. 1 and FIG. 2, the taper angle of the limiting section 7 is 60 degrees. The ability of holding the position of the adjustable stator vane can be further enhanced by setting the preferred taper angle of the limiting section.

In some embodiments, the linear expansion coefficient of the material of the position holding structure of the adjustable stator vane 2 is greater than or equal to the linear expansion coefficient of the material of the casing 1 or the adjustable stator vane 3. In some embodiments, the material of the position holding structure of the adjustable stator vane 2 is the same as the material of the casing 1 or the adjustable stator vane 3; In some other embodiments, the material of the position holding structure of the adjustable stator vane 2 is different from the material of the casing 1 or the adjustable stator vane 3, in which case the linear expansion coefficient of the material chosen for the position holding structure of the adjustable stator vane 2 should be greater than or equal to the linear expansion coefficient of the material of the casing 1 or the adjustable stator vane 3, so as to ensure that a positioning surface would not disengage when the aero-engine compressor is at the actual working state.

In some embodiments, as shown in FIG. 1 and FIG. 2, the force transmission section 6 is open type, which means that the force transmission section 6 is not in a complete cylindrical shape, and the force transmission section 6 is substantially in a C shape based on its cross section, so as not to hinder the movement of a rocker arm 8.

In some embodiments, an opening angle of the force transmission section 6 is a maximum movement angle of the rocker arm 8 for adjusting the installation angle of the adjustable stator vane plus a predetermined allowance, so as to not hinder the movement of the rocker arm 8 more effectively.

It should be noted that the 'rocker arm' is an important part of the aero-engine compressor, which can be used to adjust the installation angle of the adjustable stator vane. For example, if the maximum movement angle of the rocker arm 8 for adjusting the installation angle of the adjustable stator vane is 80 degrees, and the predetermined allowance is 10 degrees, then the opening angle of the force transmission section 6 is 90 degrees.

In some embodiments, the ratio of the height M of the force transmission section 6 to the height N of the limiting section 7 ranges from 3 to 8. The range of the ratio of the height of the force transmission section to the height of the limiting section mentioned above can improve the limit effect of the limiting section, and the adjustable stator vane can be held at the predetermined position more effectively when the aero-engine compressor is at the working state, thereby improving the aerodynamic performance of the high-pressure compressor to a certain extent.

In some embodiments, the ratio of the height M of the force transmission section 6 to the height N of the limiting section 7 is 5. The above ratio of the height of the force transmission section to the height of the limiting section can improve the limit effect of the limiting section, and the adjustable stator vane can be held at the predetermined position more effectively when the aero-engine compressor is at the working state, thereby improving the aerodynamic performance of the high-pressure compressor to a certain extent.

For example, the height M of the force transmission section 6 is 25 mm, the height N of the limiting section 7 is 5 mm, and the height L of the positioning section 5 is 10 mm.

Surely, the height of the force transmission section, the height of the limiting section and the height of the positioning section mentioned above are only a preferred form of the height of each section applied by the position holding structure of the adjustable stator vane for the aero-engine compressor in the present application. Those skilled in the art can understand based on the disclosure of the present application that other suitable heights of each section can also be applied, which does not extend the scope of protection of the claims of the present application.

In some embodiments, as shown in FIG. 1, the position holding structure of the adjustable stator vane 2 works when the aero-engine compressor is at the working state, holding the adjustable stator vane 3 at the predetermined position, so as to prevent the adjustable stator vane from being deflected and shifted from the design position due to the airflow during the operation of the aero-engine compressor, thereby improving the aerodynamic performance of the high-pressure compressor to a certain extent.

In some embodiments, as shown in FIG. 1, when the cone of the limiting section 7 fits the taper hole 12 on the top of the neck journal of the adjustable stator vane 3, a gap ΔT may exist between a flange of the positioning section 5 and the casing 1, and the gap ΔT should be controlled by a dimension chain so that $\Delta T \ngtr 0.05$ mm. Alternatively, a sealing washer can be provided at the gap to further ensure the reliability of assembly.

In some embodiments, as shown in FIG. 2, the positioning section 5, the force transmission section 6 and the limiting section 7 can be designed to be of equal thickness, or designed to be of variable thickness. The positioning section 5, the force transmission section 6 and the limiting section 7 can be designed as a whole, or designed to be sections welded together and even different materials can be chosen for each section.

In some embodiments, as shown in FIG. 1, the existence of the position holding structure of the adjustable stator vane 2 may increase the rotational resistance of the adjustable stator vane 3. After the assembly process is completed, the rotation performance of the adjustable stator vane should be tested to ensure that the blades at different positions of the same stage have the same the rotational flexibility.

As shown in FIG. 1, in one embodiment of the invention, the aero-engine compressor comprises the position holding structure of the adjustable stator vane 2 for the aero-engine compressor. The position holding structure of the adjustable stator vane 2 comprises the positioning section 5, the limiting section 7 and the force transmission section 6, wherein the positioning section 5 is mounted on the mounting hole 11 on the casing 1, the limiting section 7 is in the shape of a cone for fitting the taper hole 12 on the top of the neck journal of the adjustable stator vane 3, and the force transmission section 6 is connected between the positioning section 5 and the limiting section 7 for transmitting the load from the limiting section 7 to the positioning section 5.

According to the above technical solution, the aero-engine compressor has the following beneficial technical effects: the adjustable stator vane can be held at the predetermined position when the aero-engine compressor is at the working state, thereby improving the aerodynamic performance of the high-pressure compressor to a certain extent.

In some embodiments, as shown in FIG. 1, the aero-engine compressor further comprises a bushing 4 provided between the neck journal and the positioning section 5 of the adjustable stator vane 3, so that the wear between the adjustable stator vane and the position holding structure of the adjustable stator vane can be avoided effectively.

In some embodiments, as shown in FIG. 1, a radially inner end surface of the positioning section 5 is attached to a radially outer end surface of the mounting hole 11 (in FIG. 1, the downward direction is radially inward and the upward direction is radially outward), so as to achieve the radial positioning of the positioning section 5. In some embodiments, as shown in FIG. 1, an inner diameter of the positioning section 5 and an outer diameter of the bushing 4 are engaged by a small clearance fit. In some embodiments, as shown in FIG. 1, a radially outer end surface of the positioning section 5 is attached to a radially inner end surface of the bushing 4, so as to achieve the radial positioning of the bushing 4.

The specific embodiments of the present invention have been described above, but those skilled in the art should understand that the specific embodiments mentioned above do not limit the present invention, and those skilled in the art can make various modifications on the basis of the above disclosure, and without exceeding the scope of the invention.

What is claimed is:

1. A position holding structure for an adjustable stator vane of an aero-engine compressor, comprising: a positioning section, a limiting section and a force transmission section, wherein the positioning section is mounted on a mounting hole on a casing, is shaped as a bushing, and is in an interference fit with the mounting hole, wherein the limiting section is shaped as a cone for fitting a taper hole on a top of a neck journal of the adjustable stator vane, and wherein the force transmission section is connected between the positioning section and the limiting section for transmitting load from the limiting section to the positioning section.

2. The position holding structure of claim 1, wherein a taper angle of the limiting section ranges from 45 degrees to 135 degrees.

3. The position holding structure of claim 1, wherein the force transmission section is open.

4. The position holding structure of claim 1, wherein a height of the force transmission section is three to eight times greater than a height of the limiting section.

5. The position holding structure of claim 1, wherein the position holding structure holds the adjustable stator vane in a predetermined position while the aero-engine compressor is operating.

6. An aero-engine compressor comprising the position holding structure of claim 1.

7. The aero-engine compressor of claim 6, further comprising a bushing provided between the neck journal and the positioning section of the adjustable stator vane.

8. The aero-engine compressor of claim 6, wherein a taper angle of the limiting section ranges from 45 degrees to 135 degrees.

9. The aero-engine compressor of claim 6, wherein the position holding structure is formed from a material having a linear expansion coefficient which is greater than or equal to that of a material of the casing or the adjustable stator vane to which the position holding structure is attached.

10. The aero-engine compressor of claim 6, wherein the force transmission section is open.

11. The aero-engine compressor of claim 10, wherein an opening angle of the force transmission section is a maximum movement angle of a rocker arm for adjusting the adjustable stator vane plus a predetermined allowance.

12. The aero-engine compressor of claim 6, wherein a height of the force transmission section is three to eight times greater than a height of the limiting section.

13. The aero-engine compressor of claim 6, wherein the position holding structure holds the adjustable stator vane in a predetermined position while the aero-engine compressor is operating.

* * * * *